United States Patent
Levi et al.

(10) Patent No.: US 10,685,670 B2
(45) Date of Patent: Jun. 16, 2020

(54) WEB TECHNOLOGY RESPONSIVE TO MIXTURES OF EMOTIONS

(71) Applicant: LONGSAND LIMITED, Cambridge (GB)

(72) Inventors: Elad Levi, Yehud (IL); Avigad Mizrahi, Yehud (IL); Ran Bar Zik, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 31 days.

(21) Appl. No.: 15/566,821

(22) PCT Filed: Apr. 22, 2015

(86) PCT No.: PCT/EP2015/058737
§ 371 (c)(1),
(2) Date: Oct. 16, 2017

(87) PCT Pub. No.: WO2016/169594
PCT Pub. Date: Oct. 27, 2016

(65) Prior Publication Data
US 2018/0122405 A1 May 3, 2018

(51) Int. Cl.
*G10L 25/63* (2013.01)
*G06F 16/958* (2019.01)
*G10L 25/72* (2013.01)
*H04L 29/08* (2006.01)

(52) U.S. Cl.
CPC ............ *G10L 25/63* (2013.01); *G06F 16/958* (2019.01); *G10L 25/72* (2013.01); *H04L 67/02* (2013.01)

(58) Field of Classification Search
CPC ........ G06F 16/958; G10L 25/72; H04L 67/02
See application file for complete search history.

(56) References Cited

U.S. PATENT DOCUMENTS

| | | | |
|---|---|---|---|
| 9,706,040 B2* | 7/2017 | Kadirvel | H04M 1/72544 |
| 10,061,977 B1* | 8/2018 | Chang | G06K 9/00308 |
| 2007/0198909 A1 | 8/2007 | Terashima et al. | |
| 2007/0203889 A1* | 8/2007 | Morgan | G06F 16/9535 |
| 2007/0213981 A1* | 9/2007 | Meyerhoff | G10L 17/26 704/243 |
| 2008/0096533 A1* | 4/2008 | Manfredi | G06N 3/006 455/412.1 |

(Continued)

OTHER PUBLICATIONS

International Searching Authority., International Search Report and Written Opinion dated Dec. 22, 2015 for PCT Application No. PCT/EP2015/058737, Filed Apr. 22, 2015, 13 pgs.

(Continued)

*Primary Examiner* — Fariba Sirjani

(57) ABSTRACT

In one example in accordance with the present disclosure, a method for a web technology responsive to mixtures of emotions includes receiving, from a user, voice information related to the web technology. The method includes generating, using a voice analysis service, percentages or levels of different emotions detected in the voice information. The method includes activating, in the web technology, at least one of multiple defined designs or functions based on the different emotions detected. Each design or function may be activated when a particular percentage or level of an emotion is detected or when a particular mixture of different emotions is detected.

20 Claims, 4 Drawing Sheets

(56) References Cited

U.S. PATENT DOCUMENTS

| | | | |
|---|---|---|---|
| 2009/0002178 A1 | 1/2009 | Guday et al. | |
| 2009/0193344 A1* | 7/2009 | Smyers | G06F 3/011 |
| | | | 715/753 |
| 2011/0279359 A1 | 11/2011 | McCarty | |
| 2013/0262967 A1 | 10/2013 | Dreher et al. | |
| 2014/0140496 A1 | 5/2014 | Ripa | |
| 2014/0280296 A1* | 9/2014 | Johnston | G06K 9/00302 |
| | | | 707/769 |
| 2015/0058416 A1* | 2/2015 | Felt | H04L 67/22 |
| | | | 709/204 |
| 2015/0099968 A1* | 4/2015 | Jamello | A61B 8/465 |
| | | | 600/425 |
| 2015/0121251 A1* | 4/2015 | Kadirvel | H04M 1/72544 |
| | | | 715/753 |
| 2015/0193889 A1* | 7/2015 | Garg | G06Q 50/01 |
| | | | 705/14.49 |
| 2016/0019915 A1* | 1/2016 | Khan | G10L 25/63 |
| | | | 704/239 |
| 2016/0042226 A1* | 2/2016 | Cunico | H04N 7/147 |
| | | | 382/103 |

OTHER PUBLICATIONS

Darnell, Clayton, et al., Emotion and Voice Interfaces, <http://www.uxmatters.com/mt/archives/2008/09/emotion-and-voice-user-interfaces.php>, 6 pages, Sep. 22, 2008.

"Anonymous Dynamic Style Manipulating CSS with JavaScript W3C, Wiki"; retrieved from http://www.w3.org/wiki/index.php?title=Dynamic_style_-_manipulating_CSS_with_JavaScript&oldid=52547 on Feb. 12, 2015; Last modification Jul. 15, 2011; 3 pp.

* cited by examiner

WEB TECHNOLOGY RESPONSIVE TO MIXTURES OF EMOTIONS

BACKGROUND

Voice recognition and analysis services may analyze sound information (e.g., sound waves or sound data) originating from a person to make determinations about the emotional state of the person. For example, voice recognition and analysis services may be used in telephone based call centers to analyze, in real-time, the voice patterns of a customer such that a representative can respond to the customer's emotions. As web technologies (website applications, such as a mobile application, etc.) move more toward using verbal cues from users to control the web technologies, voice recognition and analysis services may be useful for web technologies.

BRIEF DESCRIPTION OF THE DRAWINGS

The following detailed description references the drawings, wherein.

DETAILED DESCRIPTION

Figure 1:
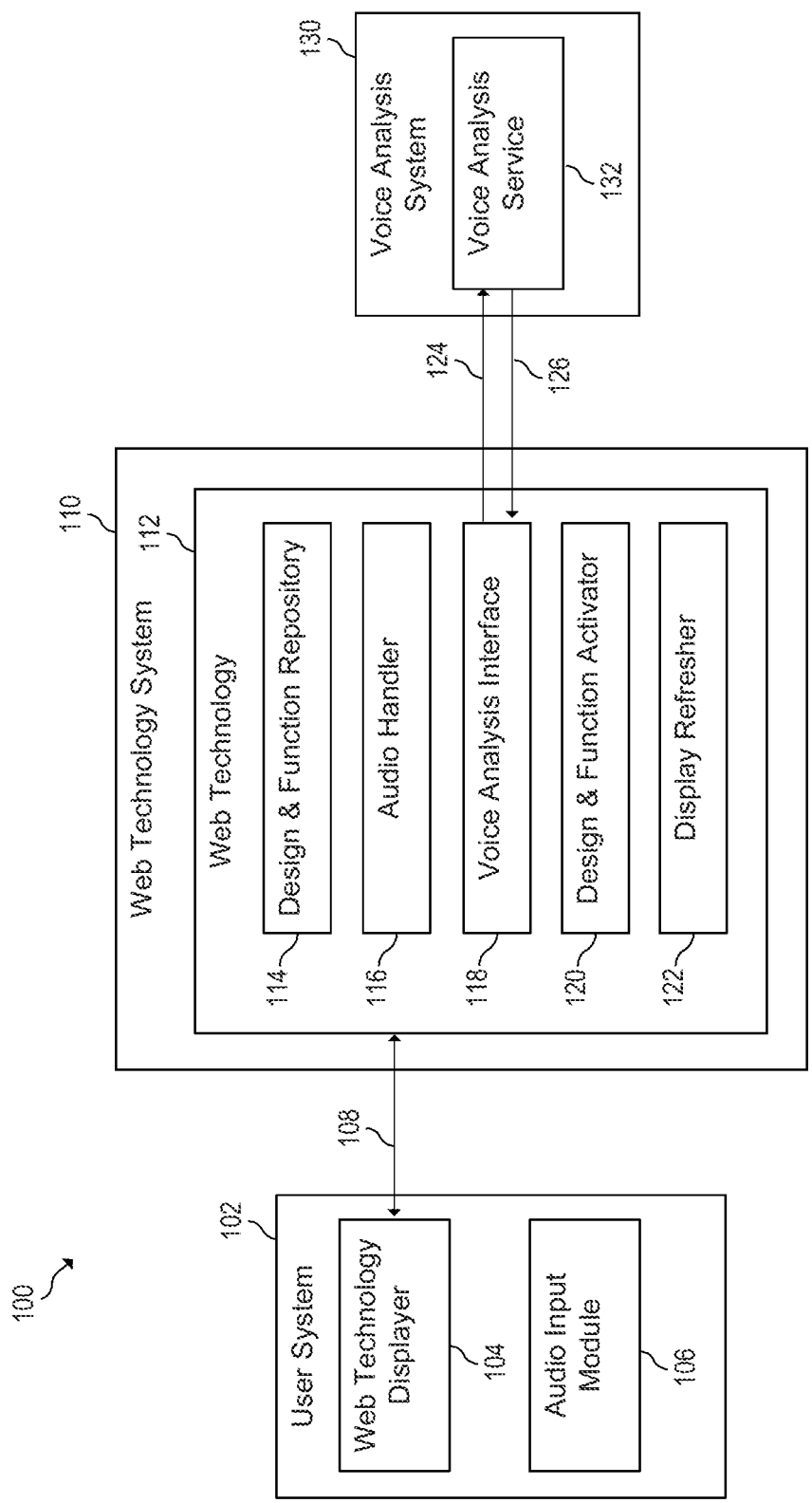
FIG. 1 is a block diagram of an example computing environment in which a web technology responsive to mixtures of emotions may be useful.

Voice recognition and analysis services may analyze sound information (e.g., sound waves or sound data) originating from a person to make determinations about the emotional state of the person. For example, voice recognition and analysis services may be used in telephone based call centers to analyze, in real-time, the voice patterns of a customer such that a representative can respond to the customer's emotions. Receiving more insightful information on customer emotions may be extremely useful to a business, for example, because it may result in faster issue resolution, and retention of more customers.

As web technologies (website applications, such as a mobile application, etc.) move more toward using verbal cues from users to control the web technologies, voice recognition and analysis services may be useful for web technologies. Like the call center situation, receiving more insightful information on user emotions may be extremely useful to developers or owners of web technologies. Some web technologies use voice recognition and analysis services to determine, for example, when a user is frustrated. For these web technologies, when a trigger emotion (e.g., frustration) is detected, some action may be taken. For example, a help document may be displayed to the user. However, in these examples, the design of the web technology does not change in response to the detected emotion. Some web technologies may switch between various "modes" based on detected emotions; however, these are defined modes that are chosen based on mutually exclusive emotion determinations, usually limited to a single emotion indicator such as whether the user is frustrated or not frustrated.

The present disclosure describes a web technology responsive to mixtures of emotions. According to the present disclosure voice information related to the web technology is used to generate percentages or levels of different emotions detected in the voice information. Then, at least one of multiple defined designs or functions may be activated to cause change in the web technology. The defined designs or functions are based on the different emotions detected. Each design or function may be activated when a particular percentage or level of an emotion is detected or when a particular mixture of different emotions is detected. Thus, not only is the present disclosure responsive to multiple detected emotions at the same time, but also, the design, layout and/or function of the web technology may be changed in response. Additionally, the defined designs or functions may be created by a developer to associate with whatever percentages or levels of different emotions the developer desires. And thus, developers are allowed flexibility to deal with mixtures of emotions as they see fit. The present disclosure provides various benefits, including allowing developers or owners of web technologies to receive more insightful information on user emotions and to take action that is tailored to the particular user. The present disclosure can accommodate users' various moods and mixtures of emotions, which may lead to improved user experience, higher sales, etc.

FIG. 1 is a block diagram of an example computing environment 100 in which a web technology responsive to mixtures of emotions may be useful. Computing environment 100 may include a user system 102 and a web technology system 110. User system 102 may communicate (e.g., over a network) with web technology system 110, for example, to access a web technology (e.g., website, application such as a mobile application, etc.). Web technology system 110 may host the web technology (e.g., 112). The above mentioned network may be any wired or wireless network, and may include any number of hubs, routers, switches, cell towers or the like. Such a network may be, for example, part of a cellular network, part of the internet and/or part of an intranet and/or other type of network.

User system 102 may include at least one computing device that is capable of communicating with at least one remote system (e.g., 110) over a network. User system 102 may include a web technology displayer 104 that allows a user to interact with a web technology (e.g., 112) on a remote system (e.g., 110). For example, web technology displayer 104 may display pages, screens, windows and the like of the web technology to the user. Web technology displayer 140 may also accept input from the user and communicate information to the web technology in response. In some examples, web technology displayer 104 may be a web browser, and the web technology (e.g., 112) may be a webpage. In other examples, web technology displayer 104 may be a mobile application, and the web technology (e.g., 112) may be mobile application server-side code. This disclosure contemplates various other examples of web technology displayers and web technologies.

User system 102 may include an audio input module 106 that may receive voice/audio information (e.g., audio data) from the user. Audio input module 106 may be in communication with a microphone or other audio input device of user system 102. Audio input module 106 may communicate with web technology displayer 104 to send the voice/audio information (e.g., 108) to the web technology 112. In this respect, the user may interact with audio input module 106 to give voice commands or voice controls to the web technology 112. These voice commands/controls may allow the user to navigate the web technology, cause functions or behaviors to activate in the web technology, or the like. In some examples, the voice/audio information (e.g., 108) may be something other than a command or control, for example, ambient comments by a user while interacting with the web technology.

Web technology system 110 may include at least one computing device that is capable of communicating with at least one user system (e.g., 102) over a network. The term "system" may be used to refer to a single computing device or multiple computing devices that communicate with each other (e.g., via a network) and operate together to provide a unified service. Web technology system 110 may store (or "host") web technology 112. More specifically, in some examples, web technology system 110 may store or host code that implements web technology 112. Web technology system 110 may receive requests from user systems (e.g., 102) to interact with web technology 112, and in response, may return data to the user systems.

Web technology 112 may receive voice/audio information (e.g., 108) and may perform various functions or behaviors in response. Additionally, web technology 112 may be responsive to emotions (e.g., mixtures of emotions) detected in the voice/audio information. Web technology 112 may, in some examples, interact with a voice analysis system 130 capable of analyzing voice/audio information (e.g., 124) and returning emotion data (e.g., 126) indicative of the emotion of the person from who the voice/audio information originated. In some examples, voice analysis system 130 may be remote to system 110, and system 110 may communicate (e.g., over a network) with voice analysis system 130. In other examples, voice analysis system 130 may be part of system 110 or part of web technology 112.

Web technology 112 may include a design and function repository 114, an audio handler 116, a voice analysis interface 118, a design and function activator 120 and a display refresher 122. Each of these components (and web technology 112 overall) may include instructions (e.g., stored on a machine-readable storage medium of system 110) that, when executed (e.g., by a processor of system 110), implement the functionality of the component. Alternatively or in addition, each of these components (and web technology 112 overall) may include electronic circuitry (i.e., hardware) that implements the functionality of the component.

Design and function repository 114 may be a collection of defined designs or functions, various ones of which may be activated at various times in response to various mixtures of user emotions. Design and function repository 114 may be associated with a physical data store, for example, at least one physical storage mechanism (e.g., hard drive, solid state drive, non-volatile memory or the like) capable of storing digital information. In some examples, each design or function may be implemented in computer code (i.e., instructions). A developer may define each design and function, e.g., in advance of users accessing web technology 112. As is described in more detail below, a developer may understand the potential output of voice analysis interface 118 (e.g., by consulting documentation of the voice analysis service 132), and may define designs and functions that correspond to various potential outputs, where different designs and/or functions may be activated based on different outputs. Each defined design or function may be capable of causing change in web technology 112 when activated. Various examples are provided below.

Design and function repository 114 may include various designs (i.e., design features), each one capable of changing at least one design aspect of web technology 112. For example, a design could change a layout or a color template of a webpage. A design could change a color, size, font, etc. of a particular element of a webpage. A design could change whether a particular element (e.g., particular text or information, images, pictures, logos, animation) of a webpage displays or is hidden. At least one of the designs in design and function repository 114 may be implemented using a style sheet language (e.g., Cascading Style Sheets or CSS). As one particular example, CSS classes may be used (e.g., one CSS class per design). Such a CSS class may include at least one design directive (e.g., "color: white;", "background: orange;", etc.) applicable to the web technology. When a CSS class is activated, the design directives of the CSS class may be applied to the web technology. CSS classes may be used in various examples herein to describe example designs. However, it should be understood that other means of implementing designs may be used, and the various examples herein should be interpreted to encompass these other means.

Design and function repository 114 may include various functions (e.g., JavaScript functions, functions written in a scripting language, etc.) that are part of the web technology. When a function is activated, it may cause change in the web technology. For example, a function may cause a pop-up window or chat window to appear (e.g., when anger or frustration emotions are detected). In some examples, to activate a function, some code of the web technology may launch the function when particular emotions are detected. In other examples, the function may be, in effect, always running, and the function may launch certain sub-functions of the function when certain tags (associated with certain emotions) are detected. More specifically, a function could include a listener (e.g., jQuery('body').hasClass('anger');) that detects when a particular tag corresponding to an emotion (e.g., anger) has been added to the body (e.g., base code file) of the web technology, and in response, a sub-function (e.g., associated with anger) of the function could be launched. As is described in more detail below, in some examples, this "tag" may be a CSS class name.

Each design and function in design and function repository 114 may be defined (e.g., in advance, by a developer) as being associated with a particular mixture of different emotions. More specifically, a design or function could be designed to be activated when a particular percentage of one emotion or particular percentages of multiple emotions are detected. In the various examples herein, a percentage may correspond to the accuracy of the emotion or the confidence that the emotion is in fact present. As one example, a developer could create a CSS class that corresponds to happiness of more than 50% (e.g., with a class name of "happiness_morethan_50"). The developer could also create a CSS class that corresponds to anxiety of less than 30% (e.g., with a class name of "anxiety_lessthan_30"). In some examples, multiple of these defined classes may be activated concurrently, based on the mixture of emotions detected. The developer could also create a CSS class that corresponds to both happiness more than 50% and anxiety less than 30% (i.e., both qualifiers are necessary for the class to be active). A developer may also define functions in a similar way. For example, a function that should activate when happiness is more than 50% may listen for a class name (e.g., in the body of the web technology code) named "happiness_morethan_50."

In some examples, instead of percentages corresponding to accuracy or confidence of emotions detected, a design or function could be designed to be activated when a particular level or strength of that emotion as detected. In these examples, a percentage scale could still be used, or some other strength scale. In these situations, the above examples of classes (e.g., happiness_morethan_50) and functions may operate in a similar manner, being designed to activate on certain emotion levels and/or mixtures of emotions.

As described above, design and function repository 114 allows a developer freedom to define when particular designs and/or functions are activated. Additionally, design and function repository 114 allows a developer to define the amount of confidence, accuracy, strength, etc. that must be present in the detected emotions before certain designs or functions are activated. For example, one developer may think that 70% confidence is accurate enough to consider a particular emotion to be present, while another developer may think that 80% is more appropriate. The present disclosure provides this benefit to allow developers the flexibility to consider both the detected emotions and the confidence, accuracy, strength, etc. Additionally, the present disclosure provides the benefit of being able to handle multiple detected emotions (e.g., a person can be happy and anxious at the same time) at once and take action based on various mixtures of emotions. Some additional examples of how various designs and/or functions are activated based on mixtures of emotions are provided below.

Audio handler 116 may access, in real-time, the voice/audio information (e.g., 108) that is sent to the web technology 112. As a user (e.g., of system 102) interacts with the web technology 112 (e.g., by interacting with web technology displayer 104 and audio input module 106), the user may speak various commands, controls or various auxiliary comments. Audio handler 116 may access this audio information in real-time and feed this audio information to voice analysis interface 118. Voce analysis interface 118 may require that its audio input be formatted in a particular manner. In these situations, audio handler 116 may convert or process the audio information before sending it to voice analysis interface 118.

Voice analysis interface 118 may receive audio information from audio handler 116. This audio information may be received within a short period of time (i.e., close to real time) from when a user of system 102 spoke the corresponding sounds. Voice analysis interface 118 may send the audio information (e.g., 124) to voice analysis system 130 (and to voice analysis service 132 in particular) for analysis. In some examples, voice analysis interface 118 may be an API (Application Programming Interface) provided by developers of the voice analysis service 132. In these examples, voice analysis service 132 may be implemented as Saas (Software as a service). In some examples, voice analysis service 132 may be part of voice analysis interface 118 and not implemented in a separate system from system 110. In these examples, there may not be a need to send the audio information to a remote system and the processing may be performed in system 110. Voice analysis interface 118 may receive (e.g., shortly after sending the audio information) emotion data (e.g., 126) from voice analysis service 132. The emotion data may be information that is indicative of the emotion of the person from who the audio information originated. This emotion data may be the output of voice analysis service 132. However, if service 132 is implemented in interface 118, the emotion data may be produced in interface 118.

The emotion data (e.g., 126) may contain various pieces of information related to a particular piece of audio information. For example, emotion data may include a set of emotions detected in the audio information. In some examples, emotion data may include all the emotions detected. In other examples, emotion data may include a set of the more dominant emotions detected, or most of the emotions detected (e.g., excluding those where the percentage of confidence or strength level is very low). Emotion data may also include a corresponding indicator for each included emotion (e.g., happiness: 50%, rage: 30%, etc.). As described above, the indicator may be a percentage (e.g., confidence or accuracy) or some other indicator (e.g., number) related to a different strength scale or the like. Because emotion data includes both the detected emotions and indicators of percentage, confidence, strength, etc., developers are able to create various designs and functions that can be activated for very precise and interesting emotional situations. Additionally, because emotion data includes multiple detected emotions with indicators for each one, developers can create various designs and functions for mixtures of emotions and are not limited to the detection of a single emotion or a binary (i.e., yes/no) indicator of whether an emotion is present.

Voice analysis interface 118 may convey or output the emotion data to be used by the web technology 112 in various ways. For example, voice analysis interface 118 may "inject" tags for the various emotions and associated indicators into the code base of web technology 112. More specifically, a single tag (e.g., happiness_morethan_50) may convey that a particular emotion (or multiple emotions) was detected and also the percentage, confidence, strength level etc. of the emotion(s). This tag may then be interpreted by the web technology as an implemented CSS class and/or the tag may be detected by a function. In some examples, voice analysis interface 118 may output multiple tags for a single emotion to convey that various ranges are satisfied. For example, if rage is detected with 75% confidence, the following tags could be inserted: rage_morethan_50, rage_morethan_60, rage_morethan_70. This may allow the most appropriate CSS class or function to be activated. Alternatively, voice analysis interface 118 may output a single tag that covers the closest range (e.g., rage_morethan_70). Various other manners of outputting tags and associating those tags with CSS classes and functions may be contemplated by this disclosure.

Design and function activator 120 may activate various CSS classes and/or functions when appropriate tags (e.g., output from interface 118) are detected. For CSS classes, design and function activator 120 may allow for CSS class definitions (e.g., in repository 114) to be applied automatically as soon as a corresponding tag is present. For functions, design and function activator 120 may launch functions automatically as soon as a corresponding tag is present. As described above, in some examples, functions may be always running and may listen for the presence of particular tags (e.g., CSS classes), and may run sub-functions of the function when detected. Because design and function activator 120 allows for defined designs and functions to be activated instead of performing fixed actions based on emotions, developers are allowed the flexibility to handle mixtures of emotions as they see fit.

Display refresher 122 may ensure that the changed version of web technology 112 is served to the user system (e.g., 102). Designs (e.g., CSS classes) and functions that are activated (e.g., by design and function activator 12) may have an immediate or real-time effect on the web technology 112 (e.g., changing the design, layout, functionality, etc.), as it pertains to the particular user from whom the audio information originated. In other words, the user of the web technology may not need to refresh a displayer, page, browser, app, etc. to see the changes. Display refresher 122 may insure that the updated and appropriate design, layout, etc. of the web technology is displayed to the user.

The following provides a number of more detailed examples to clarify some of the principles discussed herein. It may be assumed that a web technology (e.g., a webpage) has a base template or design scheme with various settings or directives related to colors, layout, font, sizing, etc. A user may interact with the web technology while also expressing voice sounds. These voice sounds may be converted to audio information and used by the web technology as described herein. A developer of the web technology may create a number of designs (e.g., CSS classes) to prepare for various emotions detected in the user's audio information. For example, the developer may create a CSS class named "anger_morethan_60", and the class may include a number of design directives. The design directives may, for example, cause the web technology to take on various cool or calming colors. The design directives may also cause elements to appear in the web technology that were not there before, for example, a help section with a picture of a customer service specialist and link to live chat. Various other design directives are possible. The developer may create another CSS class named "happiness_morethan_70". The design directives for this class may, for example, cause the web technology to take on various dynamic or bright colors.

Expanding on the anger example, an associated CSS class may look something like what is shown in Table 1 below. In this example, the CSS class changes the overall web technology color to "cool blue" with the goal that this will calm a person that is angry.

TABLE 1

```
.anger_morethan_60 {
    color: cool-blue;
}
```

Continuing on with this example, a function (e.g., JavaScript function) could also be included in the web technology that includes a listener for the CSS class name of Table 1, as shown in Table 2. As soon as the class name is injected (e.g., by voice analysis interface 118) into the code base of the web technology, the function of Table 2 may detect this and launch part of the function, for example, causing a pop-up window to appear with a chat window or telephone number.

TABLE 2

```
jQuery('body').hasClass('anger');
```

Next, in a slightly modified example, it may be assumed that voice analysis interface 118 outputs (e.g., with tags) a mixture of emotions, for example, "anger_morethan_50" and "boredom_morethan_30." It may be assumed that the developer has, in advance, defined CSS classes associated with each one of these CSS class names. It may be the case that these two classes are active concurrently because both anger and boredom were detected.

The question may arise as to how conflicts are resolved if design directives in one activated class conflict with design directives in another activated class. A developer may use various means to break ties. For example, CSS indicators may be used, as is shown in Table 3 below. In the example of Table 3, an "important" indicator is used to ensure that the anger CSS class takes priority over the boredom CSS class.

TABLE 3

```
.anger-50-plus !important {
    color: cool-blue;
}
.boredom-30-plus {
    color: orange;
}
```

Other means of breaking ties may be used as well, for example, "div" wrappers, nested HTML tags (e.g., where a deeper nested directive takes priority), etc.

Figure 2:
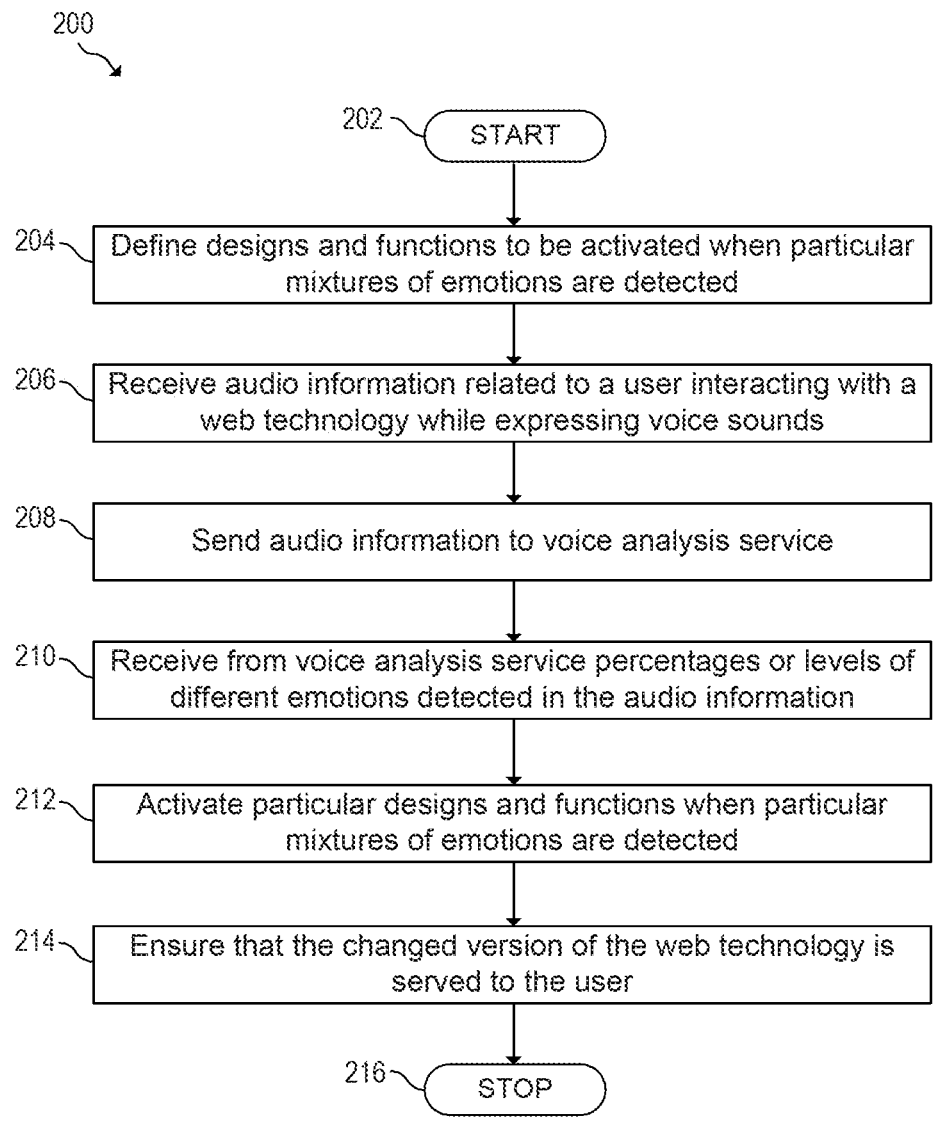
FIG. 2 is a flowchart of an example method for a web technology responsive to mixtures of emotions.

FIG. 2 is a flowchart of an example method 200 for a web technology responsive to mixtures of emotions. Method 200 may be described below as being executed or performed by a system, for example, system 110 of FIG. 1. Other suitable systems and/or computing devices may be used as well. Method 200 may be implemented in the form of executable instructions stored on at least one machine-readable storage medium of the system and executed by at least one processor of the system. Alternatively or in addition, method 200 may be implemented in the form of electronic circuitry (e.g., hardware). In alternate embodiments of the present disclosure, one or more steps of method 200 may be executed substantially concurrently or in a different order than shown in FIG. 2. In alternate embodiments of the present disclosure, method 200 may include more or less steps than are shown in FIG. 2. In some embodiments, one or more of the steps of method 200 may, at certain times, be ongoing and/or may repeat.

Method 200 may start at step 202 and continue to step 204, where the system may allow for definition of designs and functions (e.g., via design and function repository 114). As described in more detail above, these designs and functions may be activated when particular mixtures of emotions are detected. At step 206, the system may receive (e.g., via audio handler 116) audio information related to a user interacting with a web technology while expressing voice sounds. At step 208, the system may send (e.g., via voice analysis interface 118) audio information to a voice analysis service, as described in more detail above. At step 210, the system may receive (e.g., via voice analysis interface 118), from the voice analysis service, percentages or levels of different emotions detected in the audio information. At step 212, the system may be activate (e.g., via design and function activator 120) particular designs and functions when particular mixtures of emotions are detected, as described in more detail above. Activated designs and/or functions may cause change to the web technology. At step 214, the system may ensure that the changed version of the web technology is served to the user. Method 200 may eventually continue to step 216, where method 200 may stop.

Figure 3:
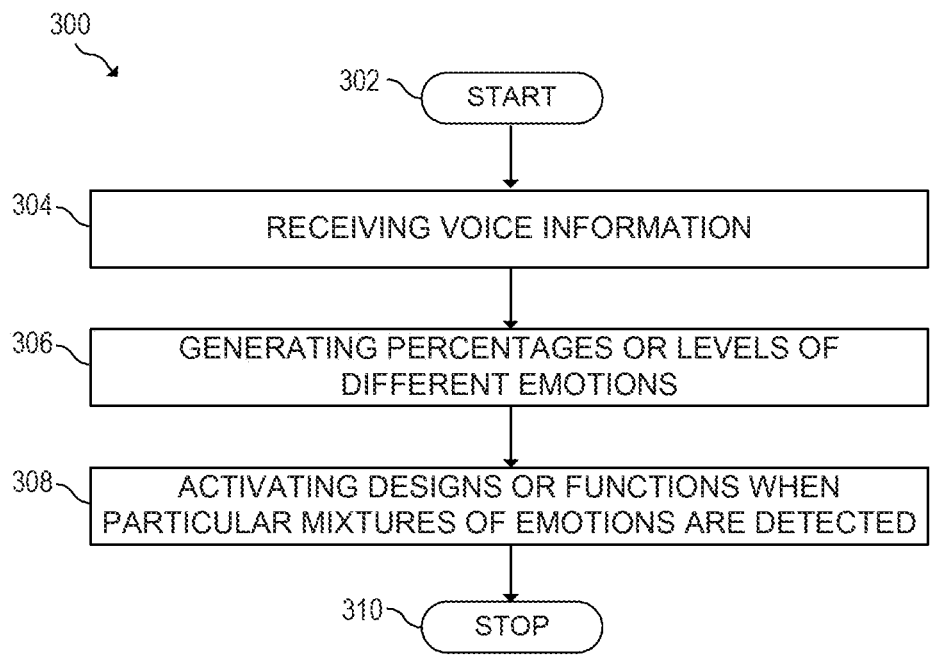
FIG. 3 is a flowchart of an example method for a web technology responsive to mixtures of emotions.

FIG. 3 is a flowchart of an example method 300 for a web technology responsive to mixtures of emotions. Method 300 may be described below as being executed or performed by a system, for example, system 110 of FIG. 1, system 400 of FIG. 4 or system 500 of FIG. 5. Other suitable systems and/or computing devices may be used as well. Method 300 may be implemented in the form of executable instructions stored on at least one machine-readable storage medium of the system and executed by at least one processor of the system. Alternatively or in addition, method 300 may be implemented in the form of electronic circuitry (e.g., hardware). In alternate embodiments of the present disclosure, one or more steps of method 300 may be executed substantially concurrently or in a different order than shown in FIG.

3. In alternate embodiments of the present disclosure, method 300 may include more or less steps than are shown in FIG. 3. In some embodiments, one or more of the steps of method 300 may, at certain times, be ongoing and/or may repeat.

Method 300 may start at step 302 and continue to step 304, where the system may receive, from a user, voice information related to the web technology. At step 306, the system may generate, using a voice analysis service, percentages or levels of different emotions detected in the voice information. At step 308, the system may activate, in the web technology, at least one of multiple defined designs or functions based on the different emotions detected. Each design or function may be activated when a particular percentage or level of an emotion is detected or when a particular mixture of different emotions is detected. Method 300 may eventually continue to step 310, where method 300 may stop.

Figure 4:
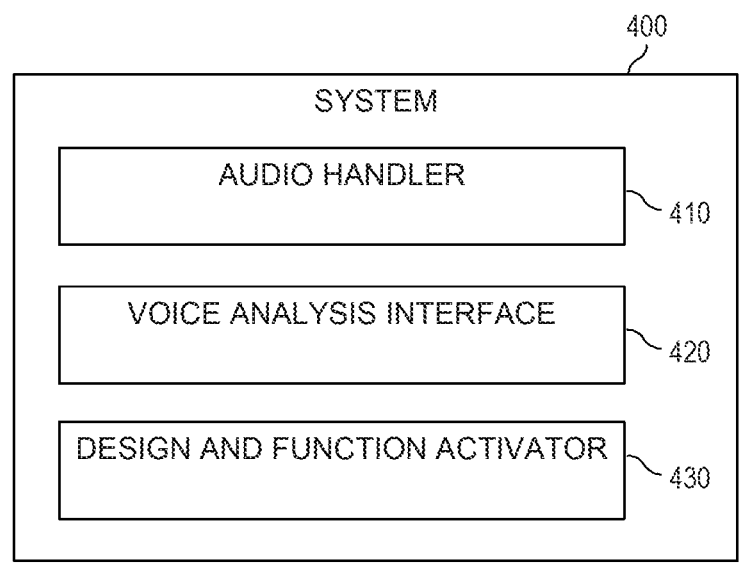
FIG. 4 is a block diagram of an example system for a web technology responsive to mixtures of emotions.

FIG. 4 is a block diagram of an example system 400 for a web technology responsive to mixtures of emotions. System 400 may be similar to system 110 of FIG. 1, for example. In the embodiment of FIG. 4, system 400 includes an audio handler 410, a voice analysis interface 420 and a design and function activator 430. Audio handler 410 may receive, from a user, voice information related to the web technology. Audio handler 410 may be implemented in the form of executable instructions stored on at least one machine-readable storage medium of system 400 and executed by at least one processor of system 400. Alternatively or in addition, audio handler 410 may be implemented in the form of one or more hardware devices including electronic circuitry for implementing the functionality of audio handler 410.

Voice analysis interface 420 may generate indicators of different emotions detected in the voice information. Voice analysis interface 420 may be implemented in the form of executable instructions stored on at least one machine-readable storage medium of system 400 and executed by at least one processor of system 400. Alternatively or in addition, voice analysis interface 420 may be implemented in the form of one or more hardware devices including electronic circuitry for implementing the functionality of voice analysis interface 420.

Design and function activator 430 may activate, in the web technology, at least one of multiple defined designs or functions based on the different emotions detected. At least two of the multiple defined designs or functions may be activated concurrently to address multiple different detected emotions. Design and function activator 430 may be implemented in the form of executable instructions stored on at least one machine-readable storage medium of system 400 and executed by at least one processor of system 400. Alternatively or in addition, design and function activator 430 may be implemented in the form of one or more hardware devices including electronic circuitry for implementing the functionality of design and function activator 430.

Figure 5:
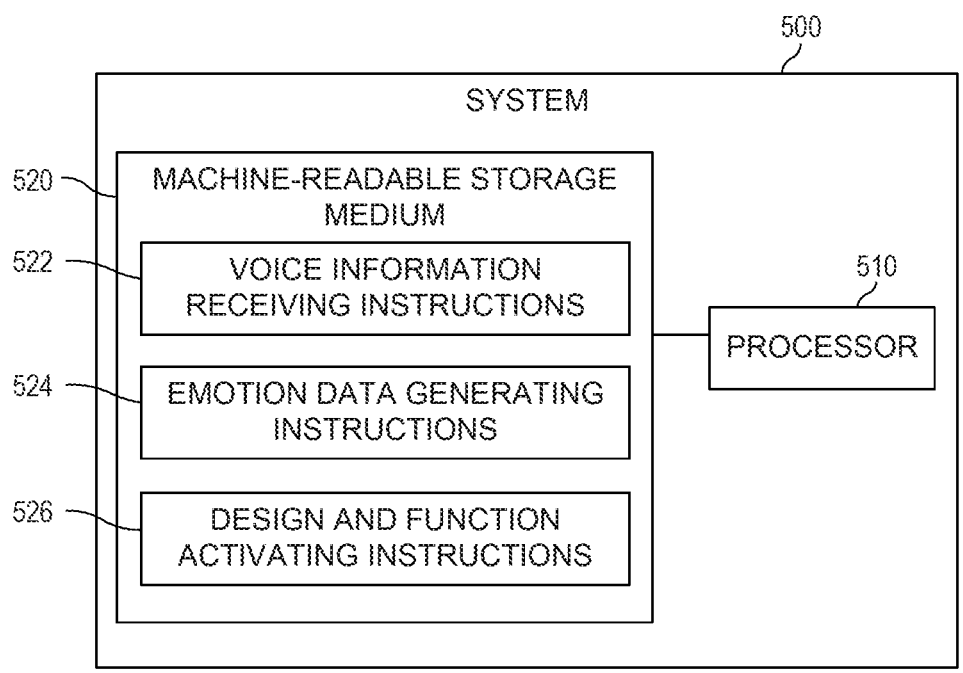
FIG. 5 is a block diagram of an example system for a web technology responsive to mixtures of emotions.

FIG. 5 is a block diagram of an example system 500 for a web technology responsive to mixtures of emotions. System 500 may be similar to system 110 of FIG. 1, for example. In the embodiment of FIG. 5, system 500 includes a processor 510 and a machine-readable storage medium 520. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 510 may be one or more central processing units (CPUs), microprocessors, and/or other hardware devices suitable for retrieval and execution of instructions stored in machine-readable storage medium 520. In the particular embodiment shown in FIG. 5, processor 510 may fetch, decode, and execute instructions 522, 524, 526 to perform in-line editor insertion. As an alternative or in addition to retrieving and executing instructions, processor 510 may include one or more electronic circuits comprising a number of electronic components for performing the functionality of one or more of the instructions in machine-readable storage medium 520. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 520 may be any electronic, magnetic, optical, or other physical storage device that stores executable instructions. Thus, machine-readable storage medium 520 may be, for example, Random Access Memory (RAM), an Electrically-Erasable Programmable Read-Only Memory (EEPROM), a storage drive, an optical disc, and the like. Machine-readable storage medium 520 may be disposed within system 500, as shown in FIG. 5. In this situation, the executable instructions may be "installed" on the system 500. Alternatively, machine-readable storage medium 520 may be a portable, external or remote storage medium, for example, that allows system 500 to download the instructions from the portable/external/remote storage medium. In this situation, the executable instructions may be part of an "installation package". As described herein, machine-readable storage medium 520 may be encoded with executable instructions for a web technology responsive to mixtures of emotions.

Referring to FIG. 5, voice information receiving instructions 522, when executed by a processor (e.g., 510), may cause system 500 to receive voice information related to the web technology. The voice information originates from a user of the web technology. Emotion data generating instructions 524, when executed by a processor (e.g., 510), may cause system 500 to generate, using a voice analysis interface, emotion data, including percentages or levels of different emotions detected in the voice information. Design and function activating instructions 526, when executed by a processor (e.g., 510), may cause system 500 to activate, in the web technology, at least one of multiple defined designs or functions based on the different emotions detected. Each design or function may be activated when a particular percentage or level of an emotion is detected or when a particular mixture of different emotions is detected. Each design or function may be activated in real-time without a refresh by the user.

The invention claimed is:

1. A method comprising:
providing, by a first computer system, a web technology, wherein the web technology is accessed by a second computer system and providing the web technology comprises selecting emotion associated features of the web technology from a plurality of candidate features;
in the first computer system, receiving data representing audio captured by the second computer system of a user of the second computer system, wherein the audio captured by the second computer system includes voice commands spoken by the user to control the web technology;
processing the data representing the audio captured by the second computer system, using a voice analysis service, to generate behavior analysis data representing percentages or levels of different emotions detected in the audio captured by the second computer system;
generating a plurality of tags for a particular emotion of the different emotions, wherein each tag of the plurality of tags corresponds to a different range of the particular emotion;
the first computer system controlling the web technology in response to the voice commands spoken by the user; and
the first computer system controlling the selecting of the emotion associated features of the web technology from the plurality of candidate features based on the plurality of tags.

2. The method of claim 1, wherein controlling the selecting of the emotion associated features comprises selecting at least two emotion associated features of the emotion associated features so that the selected at least two emotion associated features are activated concurrently.

3. The method of claim 1, wherein controlling the selecting of the emotion associated features comprises activating a Cascading Style Sheet (CSS) class associated with a tag of the plurality of tags.

4. The method of claim 3, wherein activating the CSS class causes at least one design directive to be applied to the web technology in real time.

5. The method of claim 1, wherein the emotion associated features include a JavaScript function that automatically begins to execute when activated.

6. The method of claim 1, further comprising injecting the plurality of tags into a code base of the web technology.

7. The method of claim 1, wherein controlling the selecting of the emotion associated features comprises activating a Cascading Style Sheet (CSS) class with a name corresponding to a tag of the plurality of tags.

8. The method of claim 1, wherein controlling the selecting of the emotion associated features comprises activating a JavaScript function using a listener to detect that a tag of the plurality of tags is present in a code base of the web technology and executing the JavaScript function in response.

9. The method of claim 1, wherein the emotion associated features of the web technology comprise at least one of multiple defined designs or multiple defined functions for the web technology.

10. The method of claim 1, wherein controlling the selecting of the emotion associated features of the web technology comprises selecting the emotion associated features based on a particular mixture of different emotions represented by the behavior analysis data.

11. The method of claim 1, wherein providing the web technology comprises the first computer system serving visual content to the second computer system.

12. The method of claim 1, wherein the behavior analysis data represents a confidence associated with the particular emotion and controlling the selecting of the emotion associated features is based at least in part on the confidence.

13. The method of claim 1, wherein controlling the selecting of the emotion associated features comprises controlling at least one of selecting of a color displayed on the second computer system and whether a pop-up window is displayed on the second computer system.

14. A system comprising:
a processor; and
a memory to store instructions that, when executed by the processor, cause the processor to:
provide a web technology, wherein the web technology is accessed by a remote computer system and providing the web technology comprises selecting emotion associated features of the web technology from a plurality of candidate features;
receive data representing audio captured by the remote computer system of a user of the remote computer system, wherein the audio captured by the remote computer system includes voice commands spoken by the user to control the web technology;
use a voice analysis service to provide behavior analysis data representing percentages or levels of different emotions detected in the audio captured by the remote computer system;
generate a plurality of indicators for a given emotion of the different emotions, wherein each indicator of the plurality of indicators corresponds to a different range of the given emotion;
control the web technology in response to the voice commands spoken by the user; and
control the selecting of the emotion associated features of the web technology from the plurality of candidate features based on the plurality of indicators.

15. The system of claim 14, wherein the instructions, when executed by the processor, further cause the processor to, for each emotion of the different emotions, receive data from the voice analysis service representing a percentage of a confidence in the emotion or a level of a strength of the emotion, and control the selecting of the emotion associated features of the web technology based on the percentages of confidence.

16. The system of claim 14, wherein the instructions, when executed by the processor, further cause the processor to activate a Cascading Style Sheet (CSS) class of a plurality of CSS classes based on the behavior analysis data.

17. The system of claim 16, wherein the plurality of CSS classes are associated with a plurality of candidate design directives for the web technology, and wherein the plurality of CSS classes are prioritized to resolve any conflicts between the plurality of candidate design directives when multiple CSS classes of the plurality of CSS classes are activated concurrently.

18. A non-transitory machine-readable storage medium encoded with instructions that, when executed by a processor of a system, cause the system to:
provide a web technology, wherein the web technology is accessed by a remote computer system and providing the web technology comprises selecting emotion associated features of the web technology from a plurality of candidate features;
receive data representing audio captured by the remote computer system of a user of the remote computer system, wherein the audio captured by the remote computer system includes voice commands spoken by the user to control the web technology;
use a voice analysis service to provide behavior analysis data representing percentages or levels of different emotions detected in the audio captured by the remote computer system;
generate a plurality of indicators for a given emotion of the different emotions, wherein each indicator of the plurality of indicators corresponds to a different range of the given emotion;

control the web technology in response to the voice commands spoken by the user; and control the selecting of the emotion associated features of the web technology from the plurality of candidate features based on the plurality of indicators.

19. The machine-readable storage medium of claim 18, wherein the instructions, when executed by the processor, further cause the system to activate a Cascading Style Sheet (CS S) class associated with an indicator of the plurality of indicators.

20. The machine-readable storage medium of claim 19, wherein the CSS class is associated with at least one of the following:

a change in a layout of the web technology;
a change in a color template of the web technology;
a change in a color, a size or a font of at least one element of the web technology; or
a change in whether a particular element of the web technology displays or is hidden.

* * * * *